United States Patent
Tsirkin

(10) Patent No.: US 9,842,083 B2
(45) Date of Patent: Dec. 12, 2017

(54) USING COMPLETION QUEUES FOR RDMA EVENT DETECTION

(71) Applicant: Red Hat Israel, Ltd., Raanana (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 199 days.

(21) Appl. No.: 14/715,155

(22) Filed: May 18, 2015

(65) Prior Publication Data
US 2016/0342567 A1    Nov. 24, 2016

(51) Int. Cl.
| | | |
|---|---|---|
| G06F 15/167 | (2006.01) | |
| H04L 12/06 | (2006.01) | |
| H04L 12/935 | (2013.01) | |
| H04L 12/879 | (2013.01) | |
| H04L 12/66 | (2006.01) | |

(52) U.S. Cl.
CPC ............ *G06F 15/167* (2013.01); *H04L 12/06* (2013.01); *H04L 12/66* (2013.01); *H04L 49/3018* (2013.01); *H04L 49/3027* (2013.01); *H04L 49/901* (2013.01)

(58) Field of Classification Search
USPC ........................................ 709/212, 213, 217
See application file for complete search history.

(56) References Cited

U.S. PATENT DOCUMENTS

| | | |
|---|---|---|
| 6,718,370 B1 | 4/2004 | Coffman et al. |
| 8,037,154 B2 | 10/2011 | Biran et al. |
| 8,832,688 B2 | 9/2014 | Tang et al. |
| 8,903,935 B2 | 12/2014 | Grant et al. |
| 8,918,545 B1 | 12/2014 | Cardona et al. |
| 8,996,743 B1 | 3/2015 | Alanis et al. |
| 2006/0095606 A1* | 5/2006 | Emmes ............... G06F 13/4022 710/46 |

(Continued)

OTHER PUBLICATIONS

Cohen, Ariel, "A Performance Analysis of 4X InfinBand Data Transfer Operations", Topspin Communications, Mountain View, CA, 2003, 7 pages ftp://cs.umanitoba.ca/pub/IPDPS03/DATA/W09_CAC_14.PDF.

(Continued)

*Primary Examiner* — Aftab N. Khan
*Assistant Examiner* — Marshall McLeod
(74) *Attorney, Agent, or Firm* — Lowenstein Sandler LLP

(57) ABSTRACT

Systems and methods for using completion queues for Remote Direct Memory Access (RDMA) event detection. An example method may comprise: receiving a request to create a queue pair for processing Remote Direct Memory Access (RDMA) requests using an RDMA-enabled network interface controller (RNIC), the queue pair comprising a send queue and a receive queue; associating the queue pair with a completion queue associated with the RNIC, the completion queue employed to store a plurality of completion queue elements associated with completed work requests; receiving a notification of an interrupt associated with the RNIC; and responsive to determining that at least one of a number of send queues associated with the completion queue or a number of receive queues associated with the completion queue exceeds zero, identifying at least one of: a first application registered to be notified of RDMA send events or a second application registered to be notified of RDMA receive events.

16 Claims, 4 Drawing Sheets

(56) References Cited

U.S. PATENT DOCUMENTS

| | | | |
|---|---|---|---|
| 2006/0112395 A1 | 5/2006 | Cox | |
| 2007/0226750 A1* | 9/2007 | Sharp | H04L 67/1097 |
| | | | 719/313 |
| 2011/0029847 A1* | 2/2011 | Goldenberg | G06F 11/1004 |
| | | | 714/801 |
| 2014/0317219 A1 | 10/2014 | Fitch et al. | |
| 2016/0026604 A1* | 1/2016 | Pandit | G06F 15/17331 |
| | | | 709/212 |

OTHER PUBLICATIONS

Hellwagner, Hermann and Ohlentroth, Matthias, "VI Architecture Communication Features and Performance on the Giganet Cluster LAN", Department of Information Technology, University Klagentfurt, Universitätsstraβe 65-67, Klagenfurt, Austria, 2002 pp. 421-433 http://www-itec.uni-klu.ac.at/bib/files/VI%20Architecture%20Communication%20Features%20and%20Performance%20on%20the%20Giganet%20Cluster%20LAN.pdf.

Liu, Jiuxing et al., "High Performance RDMA-Based MPI Implementation Over InfiniBand", Computer and Info. Science, The Ohio State University, Columbus, OH; Ohio Supercomputer Center, Columbus, OH, Jun. 23-26, 2003, 10 pages http://citeseerx.ist.psu.edu/viewdoc/download?doi=10.1.1.3.8081&rep=rep1&type=pdf.

Wu, Jiesheng et al.,"Design of an InfiniBand Emulator Over Myrinet: Challenges, Implementation, and Performance Evaluation", Technical Report, OSU-CISRC-2/01-TR03, 2003, 22 pages ftp://ftp.cse.ohio-state.edu/pub/communication/techreports/tr03-01-ib-emulator.pdf.

\* cited by examiner

_US 9,842,083 B2_

USING COMPLETION QUEUES FOR RDMA EVENT DETECTION

TECHNICAL FIELD

The present disclosure is generally related to virtualized computer systems, and is more specifically related to systems and methods for performing Direct Memory Access (RDMA) operations.

BACKGROUND

Remote Direct Memory Access (RDMA) is a method allowing a computer system to directly read or modify the memory of another computer system. While in traditional socket-based networks, applications request network resources from the operating system (OS) through an API which handles the data transmission on their behalf, RDMA only employs the OS to establish an input/output channel, and then allows applications to directly exchange messages without further OS intervention. Thus, RDMA provides low latency through protocol stack bypass and copy avoidance, reduces processor utilization and memory bandwidth bottleneck, and optimizes bandwidth utilization.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
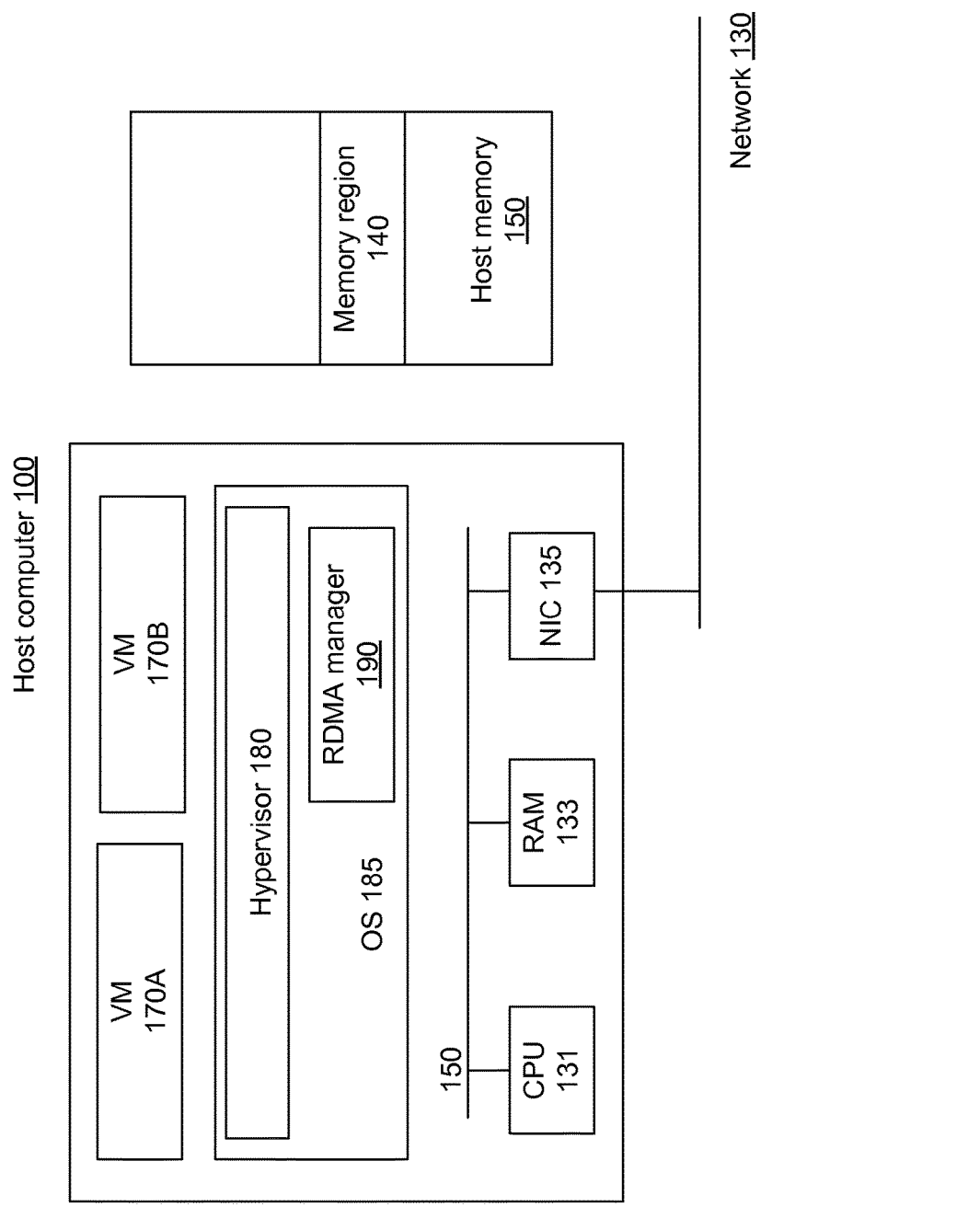
FIG. 1 depicts a high-level component diagram of one illustrative embodiment of a computer system 1000 in accordance with one or more aspects of the present disclosure.

Described herein are methods and systems for using completion queues for Remote Direct Memory Access (RDMA) event detection.

The operating system kernel may implement an RDMA send queue and an RDMA receive queue collectively forming an RDMA queue pair. The send queue is a data structure employed to store a plurality of work queue elements (WKE). Each WKE of the send queue comprises a pointer to a memory buffer for storing the outgoing RDMA data. The receive queue is a data structure employed to store a plurality of WKEs. Each WKE of the receive queue comprises a pointer to a memory buffer for storing the incoming RDMA data. Multiple send or receive WQEs may be queued at any given time to be processed by the RDMA adapter.

The operating system kernel may further implement a completion queue for notifying the applications of completing the work requests placed on the send and receive queues. In an illustrative example, an RDMA-enabled network interface controller (RNIC) may place a completion queue element (CQE) on a completion queue associated with the RNIC. The corresponding interrupt handler may then identify and awaken a sleeping application waiting on the completion queue. The application may poll the completion queue to determine whether send or receive completion events are available.

The above described technique is not always efficient, as even if a particular application only needs receive event completion notifications, such an application would still be woken up by the send completion even completion notifications, and vice versa. Aspects of the present disclosure address the above noted and other deficiencies by providing a method of using completion queues for Remote Direct Memory Access (RDMA) event detection whereby the operating kernel allows an application to selectively wait for RDMA send or receive events.

In accordance with one or more aspects of the present disclosure, the operating system kernel may receive a request to create a queue pair for processing RDMA requests using a RNIC. The kernel may associate the queue pair with a completion queue that is associated with the RNIC and is employed to store a plurality of completion queue elements associated with completed RDMA work requests. The kernel may then increment a send counter associated with the completion queue and a receive counter associated with the completion queue.

Responsive to receiving a hardware interrupt associated with an RNIC, the interrupt handler may identify a completion queue associated with the RNIC and evaluate the send and receive counter values. Responsive to determining that the value of the send counter exceeds zero, the interrupt handler may identify and awaken an application registered to be notified of RDMA send events. Responsive to determining that the value of the receive counter exceeds zero, the interrupt handler may identify and awaken an application registered to be notified of RDMA receive events. Later, responsive to receiving a request to destroy the queue pair (e.g., due to the application-initiated request or the application termination), the operating system kernel may decrement the send and receive counters.

The methods described herein below may be implemented by hypervisors running on host computer systems, as well as by non-virtualized computer systems. Various aspects of the above referenced methods and systems are described in details herein below by way of examples, rather than by way of limitation.

FIG. 1 depicts a high-level component diagram of one illustrative example of a computer system 100 operating in accordance with one or more aspects of the present disclosure. "Computer system" herein shall refer to a system comprising one or more processors, one or more memory devices, and one or more input/output (I/O) interfaces.

Computer system 100 may comprise one or more processors 131 communicatively coupled to a memory device 133 and a network interface controller (NIC) 135. Local connections within host computer system 110, including connections between processor 131, memory device 133, and NIC 135, may be provided by one or more local buses 150 of a suitable architecture.

"Processor" or "processing device" herein shall refer to a device capable of executing instructions encoding arithmetic, logical, or I/O operations. In an illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "Network interface adapter" herein shall refer to a device capable of implementing a physical layer and data link layer standard (such as Ethernet or InfiniBand).

In an illustrative example, as schematically illustrated by FIG. 1, computer system 100 may run multiple virtual machines 170 by executing a software layer 180, often referred to as "hypervisor," above the hardware and below the virtual machines. In certain implementations, hypervisor 180 may be a component of operating system 185 executed by host computer system 100. Alternatively, hypervisor 180 may be provided by an application running under host operating system 185, or may run directly on the host computer system 100 without an operating system beneath it. Hypervisor 180 may abstract the physical layer, including processors, memory, and I/O devices, and present this abstraction to virtual machines 170 as virtual devices, including virtual processors, virtual memory, and virtual I/O devices.

RDMA manager component 190 running on host computer system 100 may perform various RDMA functions in accordance with one or more aspects of the present disclosure. In certain implementations, RDMA manager component 190 may be implemented as a software component invoked by the kernel of the operating system 185. Alternatively, functions of RDMA manager component 190 may be performed by the kernel of the operating system 185.

Computer system 100 may be interconnected, via a network 130, with one or more remote computer systems (not shown in FIG. 1). In certain implementations, computer system 100 may support RDMA. An RDMA adapter 135 may be provided by an RDMA-enabled network interface controller (RNIC), such as an InfiniBand host channel adapter or an Ethernet adapter. RDMA adapter 135 may be programmed to directly read or write the user space memory.

In an illustrative example, RDMA transfers may be employed by host computer system 100 to migrate a virtual machine to a remote host computer system. Live migration may involve copying the virtual machine execution state comprising a plurality of memory pages from the origin host to the destination host while the virtual machine is still running on host computer system 100. Various other applications of RDMA transfer also fall within the scope of the present disclosure.

Figure 2:
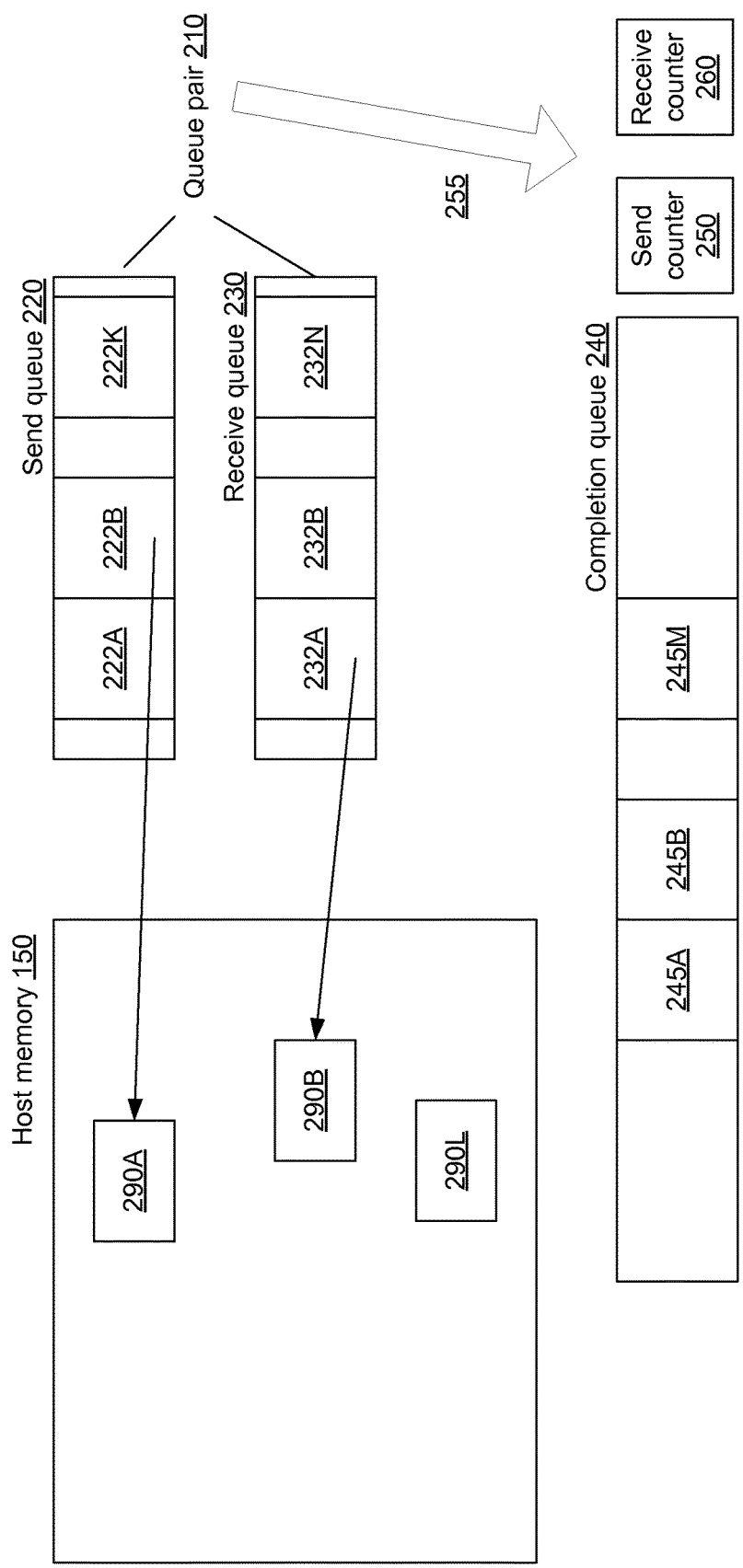
FIG. 2 schematically illustrates an example of using completion queues for RDMA event detection by a computer system operating in accordance with one or more aspects of the present disclosure.

FIG. 2 schematically illustrates an example of using completion queues for RDMA event detection by a computer system operating in accordance with one or more aspects of the present disclosure. As schematically illustrated by FIG. 2, RDMA manager component 190 may receive a request initiated by an application being executed by host computer 100 to create a queue pair for processing RDMA requests using RNIC 135.

Responsive to receiving the request, RDMA manager component 190 may create the queue pair 210 comprising a send work request queue 220 and a receive work request queue 230. As schematically illustrated by FIG. 2, send queue 220 may be provided by a data structure employed to store a plurality of work queue elements 222A-222K. Each work queue element 222A-222K may comprise a pointer to a memory buffer 290A-290M in host memory 150 that is allocated for storing the outgoing RDMA data. Similarly, receive queue 230 may be provided by a data structure employed to store a plurality of work queue elements 232A-232N. Each work queue element 232A-232N may comprise a pointer to a memory buffer 290A-290L in host memory 150 that is allocated for storing the incoming RDMA data.

Upon successfully creating queue pair 210, RDMA manager component 190 may associate queue pair 210 with a completion queue 240 that is associated with RNIC 135. While in FIG. 2 the association of queue pair 210 with completion queue 240 is schematically shown by arrow 255, in certain implementations, associating queue pair 210 with completion queue 240 may be performed by storing an identifier of queue pair 210 in a data structure referenced by completion queue 240. The queue pair identifier may be provided by an address of the memory buffer that is employed to store the queues comprises by the queue pair.

Upon associating queue pair 210 with completion queue 240, RDMA manager component 190 may then increment a send counter 250 associated with completion queue 240 and a receive counter 260 associated with completion queue 240. While FIG. 2 illustrates a single queue pair 210 being associated with completion queue 240, in various illustrative examples, two or more queue pairs may be associated with a completion queue.

In operation, work requests represented by work queue elements may be placed on send queue 220 and/or receive queue 230 by one or more applications being executed by host computer system 100 for processing by RDMA manager component 190. Upon submitting a work request, an application may transition into a sleeping state which may be interrupted by a completion queue element 245 comprising the status of the completed operation.

Upon completing a work request, RNIC 135 may place a completion queue element (CQE) on a completion queue associated with the RNIC. In an illustrative example, RNIC 135 may place a CQE on the completion queue responsive to completing a work request on the Send Queue of the queue pair, such as RDMA send, RDMA write, or RDMA read work request. In another illustrative example, RNIC 135 may place a CQE on the completion queue responsive to completing a work request on the Receive Queue of the queue pair, such as RDMA receive work request.

Responsive to receiving a hardware interrupt associated with RNIC 135, the interrupt handler may identify a completion queue 240 associated with RNIC 135 and evaluate the send and receive counter values 250 and 260. Responsive to determining that the value of send counter 250 exceeds zero, the interrupt handler may identify and awaken an application registered to be notified of RDMA send events. Responsive to determining that the value of receive counter 260 exceeds zero, the interrupt handler may identify and awaken an application registered to be notified of RDMA receive events.

Later, responsive to receiving a request to destroy the queue pair (e.g., due to the application-initiated request or the application termination), RDMA manager component 190 may decrement the send and receive counters 250 and 260.

Figure 3:
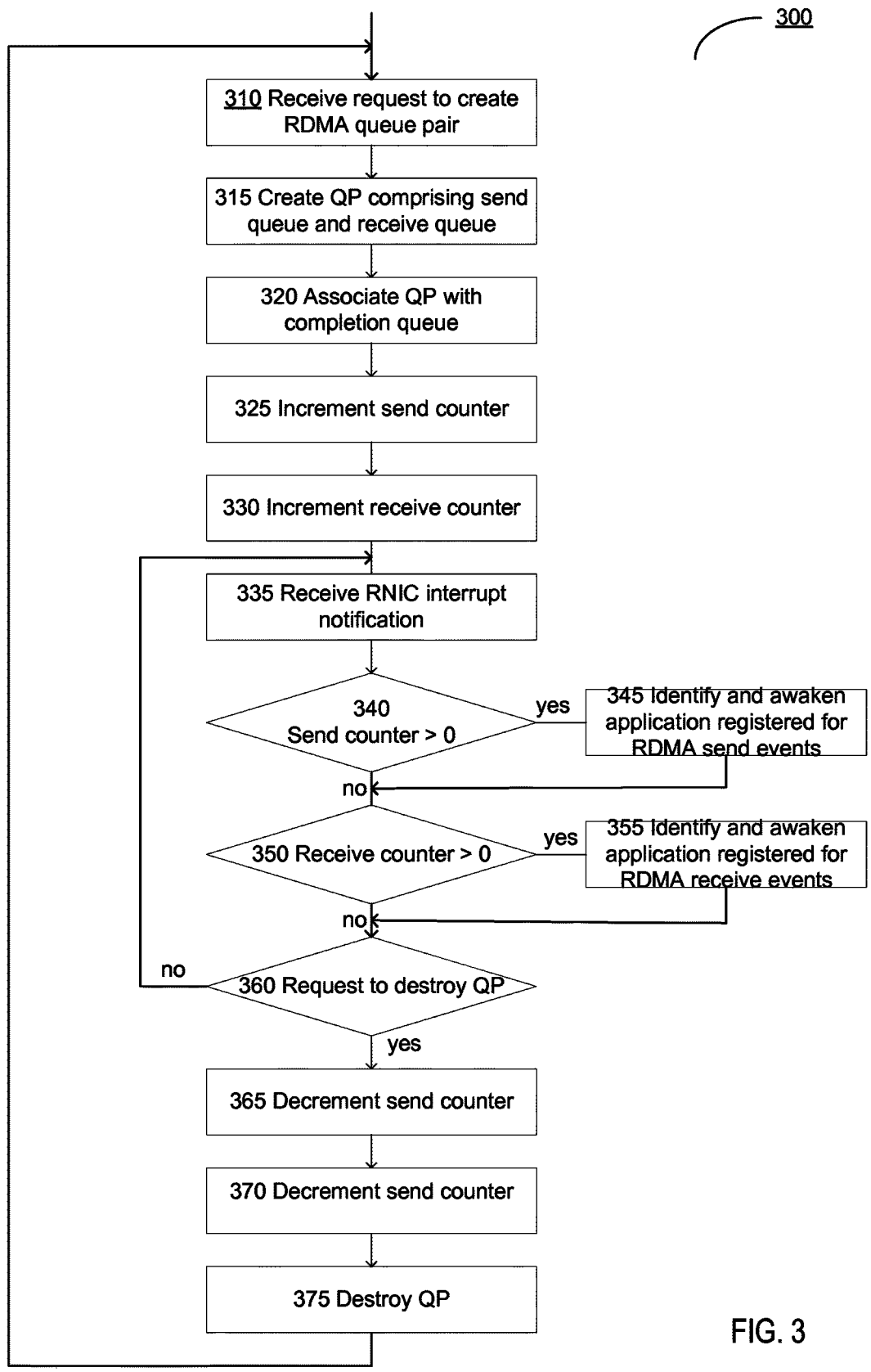
FIG. 3 depicts a flow diagram of an example method for using completion queues for RDMA event detection, in accordance with one or more aspects of the present disclosure.

FIG. 3 depicts a flow diagram of one illustrative example of a method 300 for using completion queues for RDMA event detection, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device executing an RDMA manager component implementing the method may receive a request to create a queue pair for processing RDMA requests using an RDMA-enabled network interface controller (RNIC).

At block 315, the processing device may create a queue pair comprising a send work request queue and a receive work request queue. The send queue may be provided by a data structure employed to store a plurality of work queue elements, whereby each work queue element comprises a pointer to a memory buffer in the host memory that is allocated for storing the outgoing RDMA data. Similarly, the receive queue may be provided by a data structure employed to store a plurality of work queue elements, whereby each work queue element comprises a pointer to a memory buffer in the host memory that is allocated for storing the incoming RDMA data, as described in more details herein above.

At block 320, the processing device may associate the created queue pair with a completion queue that is associated with the specified RNIC. The completion queue may be employed to store a plurality of completion queue elements associated with completed work requests, as described in more details herein above.

At block 325, the processing device may increment a first counter reflecting a number of send queues associated with the completion queue.

At block 330, the processing device may increment a second counter reflecting a number of receive queues associated with the completion queue.

At block 335, the processing device may receive a notification of an interrupt associated with the RNIC associated with the specified completion queue, as described in more details herein above.

Responsive to determining, at block 340, that the value of the first counter exceeds zero, the processing device may, at block 345, identify and awaken an application registered to be notified of RDMA send events, as described in more details herein above.

Responsive to determining, at block 350, that the value of the first counter exceeds zero, the processing device may, at block 355, identify and awaken an application registered to be notified of RDMA send events, as described in more details herein above.

Responsive to receiving, at block 340, that the value of the first counter exceeds zero, the processing may continue at block 365; otherwise, the method may loop back to block 335.

At block 365, the processing device may decrement a first counter reflecting a number of send queues associated with the completion queue.

At block 370, the processing device may decrement a second counter reflecting a number of receive queues associated with the completion queue.

At block 370, the processing device may destroy the queue pair, and the method may loop back to block 310.

Figure 4:
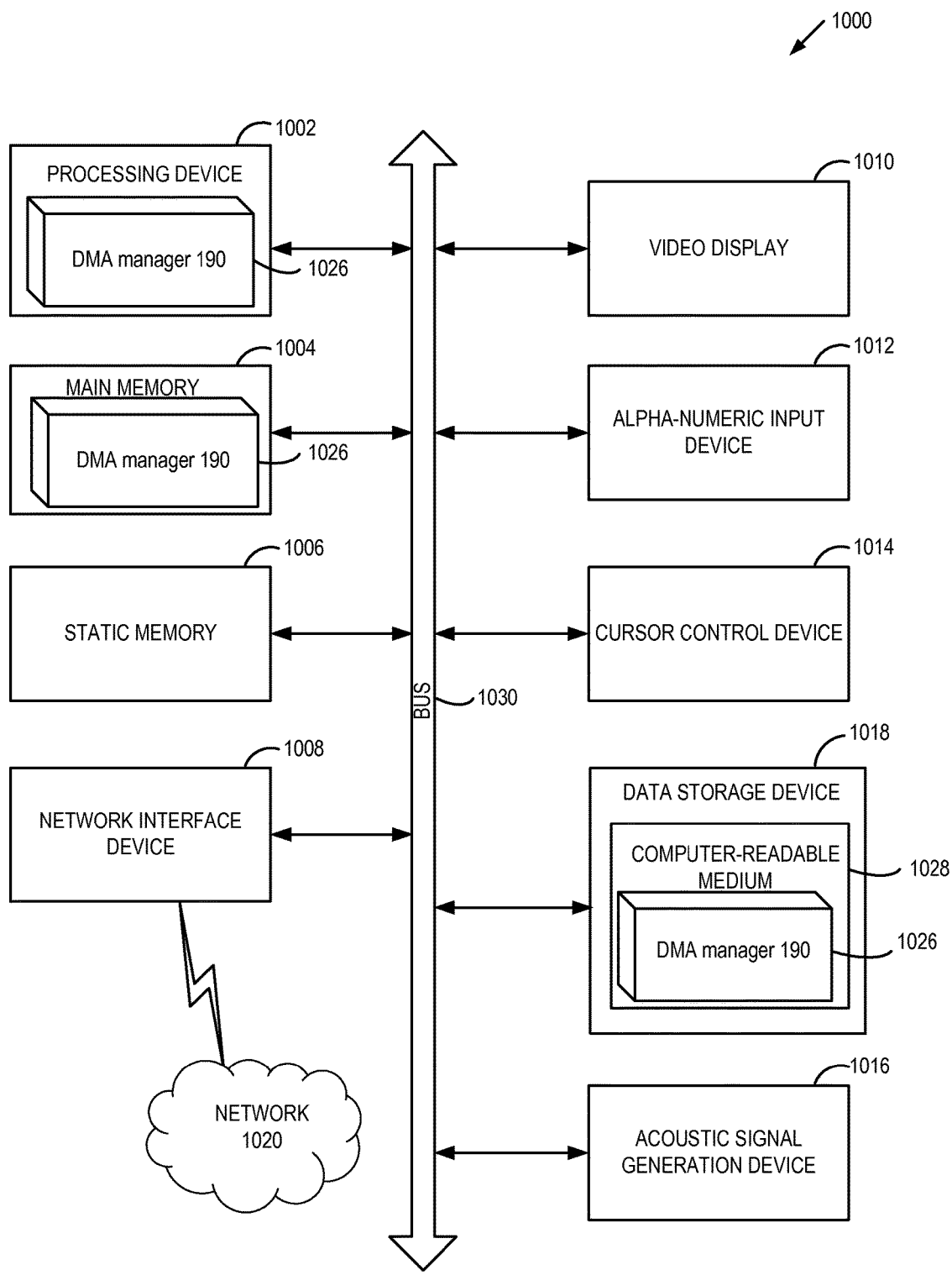
FIG. 4 depicts a block diagram of an illustrative computer system operating in accordance with the examples of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute RDMA manager component 190 implementing method 300 for using completion queues for RDMA event detection.

Example computer system 1000 may further comprise a network interface controller 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of RDMA manager component 190 implementing method 300 for using completion queues for RDMA event detection.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface controller 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The invention claimed is:

1. A method, comprising:
receiving, by a processing device, a request to create a queue pair for processing Remote Direct Memory Access (RDMA) requests using an RDMA-enabled network interface controller (RNIC), the queue pair comprising a send queue and a receive queue; associating the queue pair with a completion queue associated with the RNIC, the completion queue employed to store a plurality of completion queue elements associated with completed work requests; receiving a notification of an interrupt associated with the RNIC; responsive to determining that a number of send queues associated with the completion queue exceeds zero, identifying an application registered to be notified of RDMA send events; and awakening the application.

2. The method of claim 1, wherein the send queue is provided by a data structure employed to store a plurality of work queue elements, each work queue element comprising a pointer to a memory buffer for storing incoming RDMA data.

3. The method of claim 1, wherein the receive queue is provided by a data structure employed to store a plurality of work queue elements, each work queue element comprising a pointer to a memory buffer for storing outgoing RDMA data.

4. The method of claim 1, wherein associating the queue pair with the completion queue comprises incrementing at least one of: a first counter reflecting the number of send queues associated with the completion queue or a second counter reflecting the number of receive queues associated with the completion queue.

5. The method of claim 4, further comprising:
responsive to receiving a request to destroy the queue pair, decrementing at least one of: the first counter or the second counter.

6. The method of claim 1, further comprising:
receiving a request for RDMA send event notifications initiated by the application.

7. A system, comprising:
a memory; and a processing device operatively coupled to the memory, the processing device to: receive a request to create a queue pair for processing Remote Direct Memory Access (RDMA) requests using an RDMA-enabled network interface controller (RNIC), the queue pair comprising a send queue and a receive queue; associate the queue pair with a completion queue associated with the RNIC, the completion queue employed to store a plurality of completion queue elements associated with completed work requests; receive a notification of an interrupt associated with the RNIC; responsive to determining that at least one of a number of send queues associated with the completion queue or a number of receive queues associated with the completion queue exceeds zero, identify at least one of: a first application registered to be notified of RDMA send events or a second application registered to be notified of RDMA receive events; and awaken at least one of: the first application or the second application.

8. The system of claim 7, wherein the send queue is provided by a data structure employed to store a plurality of work queue elements, each work queue element comprising a pointer to a memory buffer for storing incoming RDMA data.

9. The system of claim 7, wherein the receive queue is provided by a data structure employed to store a plurality of work queue elements, each work queue element comprising a pointer to a memory buffer for storing outgoing RDMA data.

10. The system of claim 7, wherein to associate the queue pair with the completion queue, the processing device is to increment at least one of: a first counter reflecting the number of send queues associated with the completion queue or a second counter reflecting the number of receive queues associated with the completion queue.

11. The system of claim 10, wherein the processing device is further to:
responsive to receiving a request to destroy the queue pair, decrement at least one of: the first counter or the second counter.

12. The system of claim 7, wherein the processing device is further to:
receive at least one of: a first application-initiated request for RDMA send event notifications or a second application-initiated request for RDMA receive event notifications.

13. A computer-readable non-transitory storage medium comprising executable instructions to cause a processing device to: receive, by the processing device, a request to create a queue pair for processing Remote Direct Memory Access (RDMA) requests using an RDMA-enabled network interface controller (RNIC), the queue pair comprising a send queue and a receive queue; associate the queue pair with a completion queue associated with the RNIC, the completion queue employed to store a plurality of completion queue elements associated with completed work requests; receive a notification of an interrupt associated with the RNIC; responsive to determining that a number of receive queues associated with the completion queue exceeds zero, identify an application registered to be notified of RDMA receive events; and awaken the application.

14. The computer-readable non-transitory storage medium of claim 13, wherein the send queue is provided by a data structure employed to store a plurality of work queue elements, each work queue element comprising a pointer to a memory buffer for storing incoming RDMA data.

15. The computer-readable non-transitory storage medium of claim 13, wherein the receive queue is provided by a data structure employed to store a plurality of work queue elements, each work queue element comprising a pointer to a memory buffer for storing outgoing RDMA data.

16. The computer-readable non-transitory storage medium of claim 13, further comprising executable instructions causing the processing device, responsive to associating the queue pair with the completion queue, to increment at least one of: a first counter reflecting the number of send queues associated with the completion queue or a second counter reflecting the number of receive queues associated with the completion queue.

* * * * *